United States Patent [19]
Wiebe

[11] Patent Number: 5,876,001
[45] Date of Patent: Mar. 2, 1999

[54] APPARATUS FOR SUPPORTING COOLING PIPES AND REINFORCING BARS FOR AN ICE RINK

[76] Inventor: Jacob Wiebe, 60 Heaton Avenue, Winnipeg, Manitoba, Canada, R3B 3E3

[21] Appl. No.: 734,582

[22] Filed: Oct. 17, 1996

[51] Int. Cl.$^6$ ........................................................ F16L 3/22
[52] U.S. Cl. ............................ 248/68.1; 248/49; 248/175
[58] Field of Search ............................... 248/68.1, 49, 50, 248/175, 74.2, 73, 57

[56] References Cited

U.S. PATENT DOCUMENTS

| 991,736 | 5/1911 | Minnick | 248/68.1 |
|---|---|---|---|
| 2,767,946 | 10/1956 | Weeks | 248/50 |
| 3,512,231 | 5/1970 | Palmer | 52/687 |
| 4,080,770 | 3/1978 | Vigh | 52/689 |
| 5,467,948 | 11/1995 | Gillespie | 248/68.1 |

OTHER PUBLICATIONS

Affidavit by one Duane Lucht (8 pages).
Superior brochure (7 pages).

*Primary Examiner*—Leslie A. Braun
*Assistant Examiner*—Gwendolyn Baxter
*Attorney, Agent, or Firm*—Adrian D. Battison; Murray E. Thrift

[57] ABSTRACT

Apparatus for supporting cooling pipes for an ice rink comprises an elongate base on which is mounted a plurality of upstanding vertical legs and cross wires for supporting the pipes and reinforcing bars necessary for burying in a cast layer of concrete. Each cross wire defines a generally U shaped cradle for properly supporting the cooling pipes. The apparatus can also provide supports for a lower layer of horizontal reinforcing bars and an upper layer of horizontal reinforcing bars which are properly spaced from the cooling pipes.

15 Claims, 3 Drawing Sheets

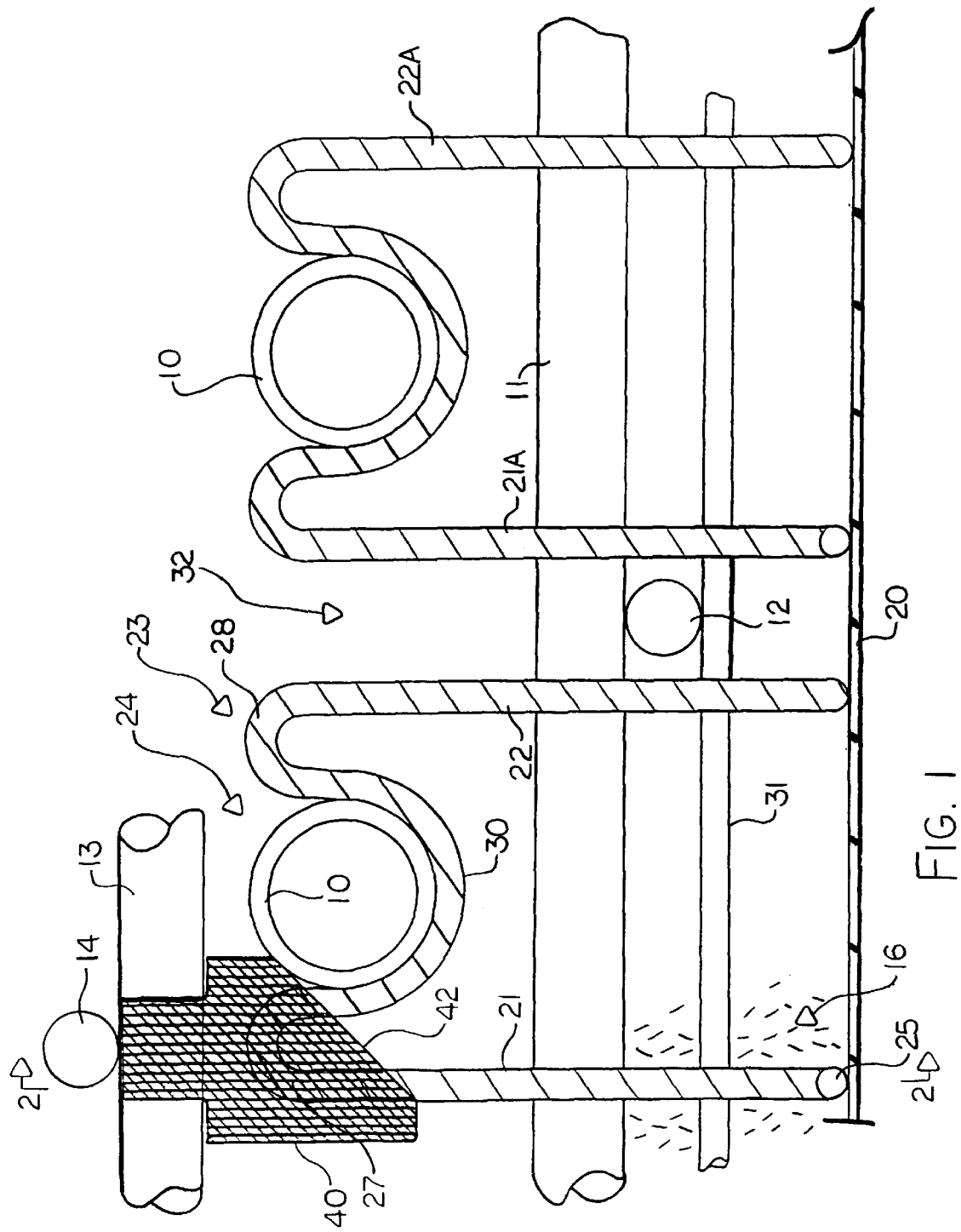

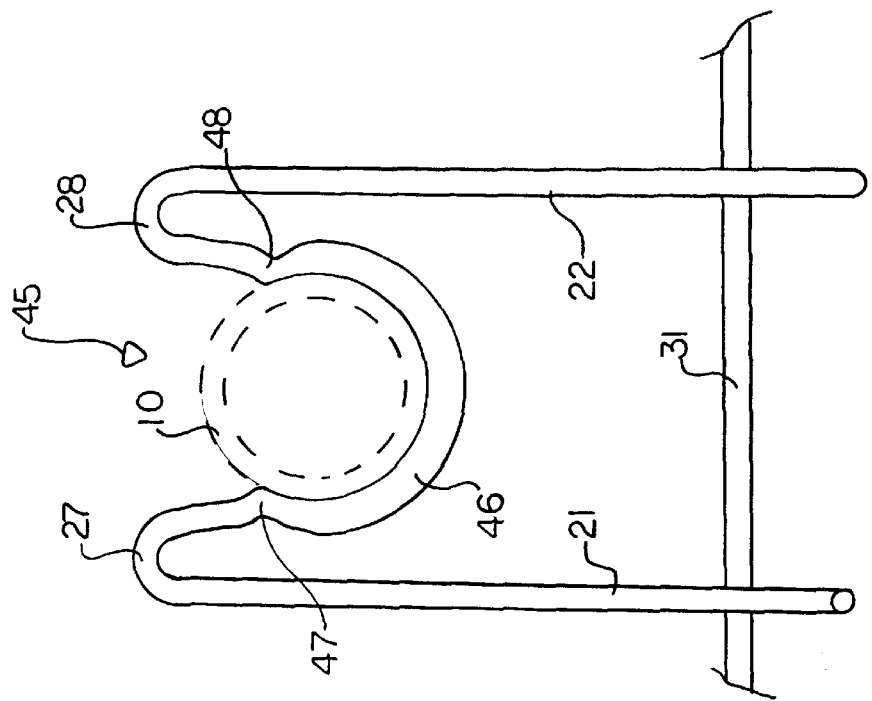
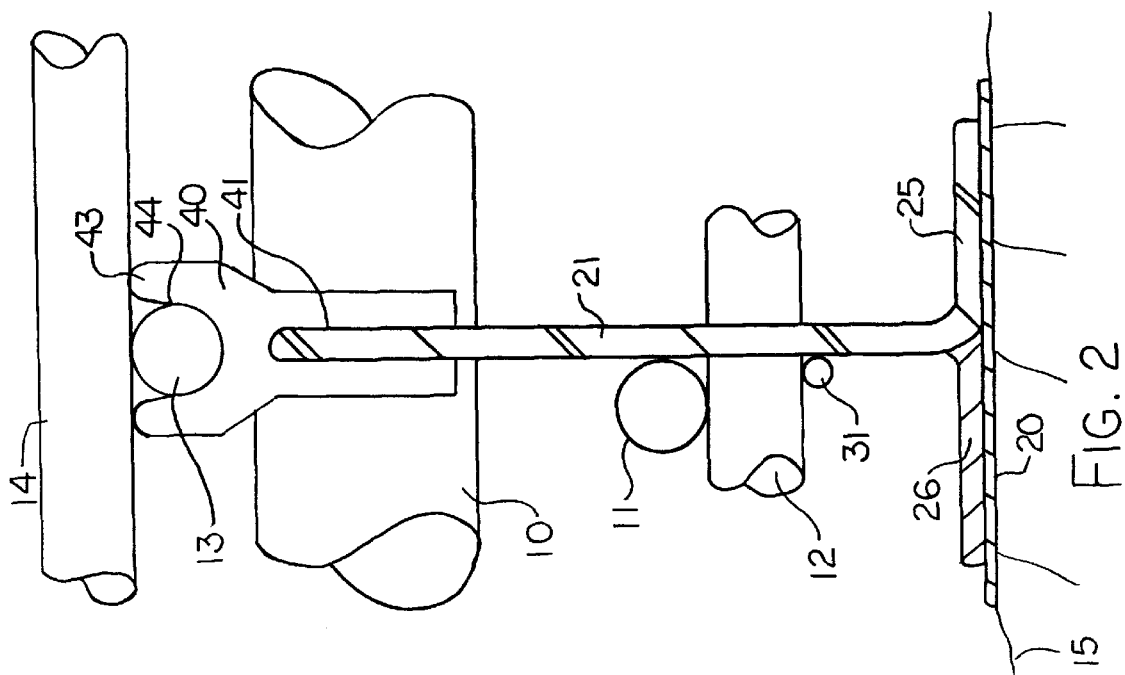

5,876,001

APPARATUS FOR SUPPORTING COOLING PIPES AND REINFORCING BARS FOR AN ICE RINK

BACKGROUND OF THE INVENTION

This invention relates to an apparatus for supporting cooling pipes and reinforcing bars for the cast concrete layer of an ice rink.

Ice rinks are formed by casting a layer of concrete on top of a prepared horizontal surface and by embedding in the concrete horizontal cooling pipes which provide cooling of a layer of water flooded onto the top surface of the concrete layer.

During manufacture of the concrete layer, it is necessary to support the cooling pipes so that they are carried in the concrete layer close to but spaced from the top surface of the concrete layer. In addition it is preferable that the same support for the cooling pipes also support reinforcing bars necessary to structurally reinforce the concrete layer. In some cases a layer of reinforcing bars is located adjacent the bottom surface of the concrete layer and also a layer is arranged adjacent the top surface of the concrete layer.

An example of an apparatus of this general type is shown in U.S. Pat. No. 5,467,948 (Gillespie). This arrangement shows a horizontal base with a plurality of vertically upstanding legs. Horizontally across the legs at a position spaced from the base is provided a cross wire which is arranged to support first reinforcing bars extending at right angles to the cross bars. On top of the first reinforcing bars is applied a layer of secondary enforcing bars at right angles to the first reinforcing bars and therefore parallel to the cross bars. On top of the secondary reinforcing bars is laid the cooling pipes so that the cooling pipes are supported wholly by the reinforcing bars. The top of the legs is pinched inwardly to restrict upward movement of the cooling pipes and hold them at a maximum height from the base. This arrangement has some advantages over the conventional arrangements on the market place but has some disadvantages in that the cooling pipes are supported on the reinforcing bar.

SUMMARY OF THE INVENTION

It is one object of the present invention, therefore, to provide an improved apparatus for supporting the cooling pipes of an ice rink.

According to one aspect of the invention there is provided an apparatus for supporting cooling pipes in an ice rink comprising: a base for resting on a ground support surface; a plurality of upstanding wire legs attached to the base for support thereby arranged in a row of the legs across the base; and a plurality of wire U-shaped cradles supported by the legs at spaced positions along the row, each for supporting a respective pipe, with a bottom portion of each U-shaped cradle being shaped to cup an outside surface of the respective pipe.

Preferably each cradle is integrally formed with at least one of the legs so as to be defined at a top of the respective leg by bending of the leg.

Preferably each cradle is integrally formed with two of the legs by bending a portion at a top of each leg to form an upper part of the U shaped cradle and the two legs and the U shaped cradle are coplanar.

Preferably there is provided a horizontal cross bar below the cradles and attached to the legs at a position thereon spaced upwardly from the base for supporting a lower reinforcing bar and a space between each cradle and the next adjacent cradle to allow the reinforcing bar to be dropped downwardly between the cradles to the cross bar.

Preferably there is provided a horizontal cross bar below the cradles and attached to the legs at a position thereon spaced upwardly from the base for supporting a lower reinforcing bar and a space between each cradle and the next adjacent cradle to allow the reinforcing bar to be dropped downwardly between the cradles to the cross bar, the space being defined between one leg of a first cradle and a next adjacent leg of a next adjacent cradle.

Preferably the base comprises a horizontal wire portion integrally formed with a respective one of the legs and bent relative thereto with alternate ones of the portions being directed in opposed directions relative to a common vertical plane of the legs and an optional a horizontal base plate attached to the horizontal portions.

Preferably each wire U-shaped cradle includes an inturned portion above the bottom portion for restricting upward movement of the pipe out of the cradle.

Preferably the wire forming the U shaped cradle is bent inwardly on each leg of the cradle above the bottom portion.

Preferably there is also provided means for supporting a top reinforcing bar at a height equal to or above the height of the pipe.

Preferably the supporting means comprises a separate saddle portion engageable onto a top of a respective one of the legs and the saddle is located on a top of the bent portion joining the respective leg with the respective cradle.

Preferably the saddle comprises a molded plastics member having a recess at a bottom portion for engaging over the bent portion and a receptacle at a top for receiving the reinforcing bar.

Preferably the cradle is formed in a generally horizontally extending wire member and the wire member includes means for supporting a top reinforcing bar thereon.

Preferably the wire member is bent to form a second cradle shaped to receive the reinforcing bar therein.

Preferably the legs extend vertically upwardly beyond the wire member to define with the wire member a receptacle for receiving the reinforcing bar.

Preferably the legs are horizontally spaced by a distance sufficient just to receive the reinforcing bar therebetween.

One embodiment of the invention will now be described in conjunction with the accompanying drawings in which:

BRIEF DESCRIPTION OF THE DRAWINGS

FIG. 1 is a front elevational view of an apparatus according to the present invention showing the apparatus in assembled condition with the reinforcing bars and pipes supported thereby.

FIG. 2 is a cross sectional view along the lines 2—2 of FIG. 1.

FIG. 3 is a front elevational view similar to that of FIG. 1 showing one part only of the apparatus and showing a modified arrangement.

In the drawings like characters of reference indicate corresponding parts in the different figures.

DETAILED DESCRIPTION

Figure 6:
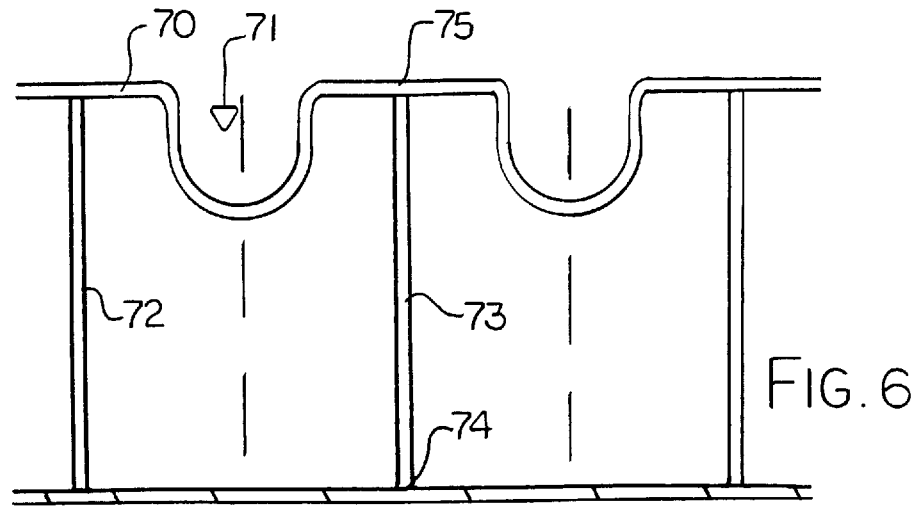
FIG. 6 is a front elevational view of a third modified arrangement.

In FIGS. 1 and 2 is shown a first embodiment of the apparatus for use in supporting cooling pipes 10, lower reinforcing bars 11 and 12 and upper reinforcing bars 13 and 14. The apparatus is mounted on a support surface 15 and is arranged for receiving a concrete layer cast onto the support surface 15 and surrounding the support apparatus, the reinforcing bars and the pipes as indicated generally at 16.

The apparatus comprises a base plate 20 for resting upon the surface 15. On top of the base plate 20 is mounted a plurality of upstanding legs 21, 22, 21A and 22A. The legs are arranged in a coplanar vertical row. It will be appreciated that the number of legs in the apparatus can vary. In FIG. 1 is shown only 4 such legs arranged in two pairs but of course the number can be increased by adding further pairs up to a suitable maximum number depending upon a convenient length of the finished apparatus.

As the apparatus is in effect repeated so that a first pair of legs is identical to a second pair of legs, only one of the structures defined by the pair of legs will be described in detail. Thus the legs 21 and 22 form part a support 23 defined by the legs and by an intermediate cradle portion 24.

At the bottom of each leg is formed a horizontal portion 25, 26. The horizontal portions are bent in opposed directions as best shown in FIG. 2 to provide a stable structure in the form of a base. As the structure is relatively stable without the base plate 20, the base is optional and its use may depend upon the material forming the surface 15 as to whether this is soft or relatively rigid.

The legs 21 and 22 extend upwardly from the base and are bent at an upper end of the legs so as to form a smoothly curved apex 27, 28 of semi circular shape. The apexes are connected to the concavely curved cradle 30 which depends downwardly from the apexes and is positioned between the two apexes. The structure defined by the legs and the central cradle portion is coplanar and inside elevation has the appearance of a "M".

At a position part way down the legs is provided a horizontal cross bar 31 which extends longitudinally of the apparatus and interconnects each pair of legs with the next pair of legs.

In between the leg 22 and the leg 21A is provided a space 32 which extends from the apex 28 downwardly to the cross bar 31.

In assembly of the apparatus, the apparatus is placed on the supporting surface 15 so as to extend at right angles to the intended direction of the cooling pipes 10. The apparatus is arranged end to end with similar such apparatus so as to form a row of the apparatus or across a full width of the area to be covered with concrete. Similar such apparatus are arranged in rows parallel to the first row with a space in between the rows sufficient to provide effective support for the pipes.

With the rows so assembled, the lower most rebar 12 is dropped into position through the space 32 so as to rest upon the upper surface of the cross bar 31.

Rebar at right angles to the first layer of rebar 12 is then dropped onto the top surface of the rebar 12 between the rows of the support apparatus.

The pipes 10 are then threaded into position and dropped into the cradle portions 24.

In the event that the top rebar 13 and 14 is arranged to be spaced above the upper surface of the pipes, a saddle 40 is provided which is formed of molded plastics material and defines a lower receptacle 41 for receiving the upper apex 27 joining the leg 21 and the cradle 24. A lower surface of the saddle is chamfered as indicated at 42 to avoid interfering with the position of the pipe 10. The receptacle has a depth and width sufficient just to receive the apex 27 as a press fit so as to remain in position on the apex and standing upwardly therefrom. At a top of the molded saddle 40 is provided a yoke 43 defining a channel 44 for receiving the rebar 13 at right angles to the pipe 10. The rebar 13 is thus supported on top of the apexes at a position spaced upwardly from the apexes and thus from the top of the pipe. The rebar 14 can simply be dropped on top of the rebar 13 at right angles thereto.

Turning now to FIG. 3 there is shown a modification of the apparatus of FIGS. 1 and 2. In this modification, the cradle section generally indicated at 45 is modified so that it has an increased depth from the top of the apexes 27 and 28 so as to support the pipe 10 at a position so that the top surface of the pipe 10 is well below the top of the apexes 27 and 28. In addition the cradle portion 45 includes the semi circular bottom portion 46 together with a pair of inwardly projecting bent sections 47 and 48 of the wire forming the cradle. The inward projections 47 and 48 are arranged to be just sufficient to allow to be pressed into place and are arranged just above the horizontal central plane of the pipe so as to act as restrictions inhibiting release of the pipe from the cradle portion 45. The projections 47 to 48 thus inhibit the tendency of the pipe and any elastic defamation therein from tending to lift the pipe out of the cradle portion.

Figure 5:
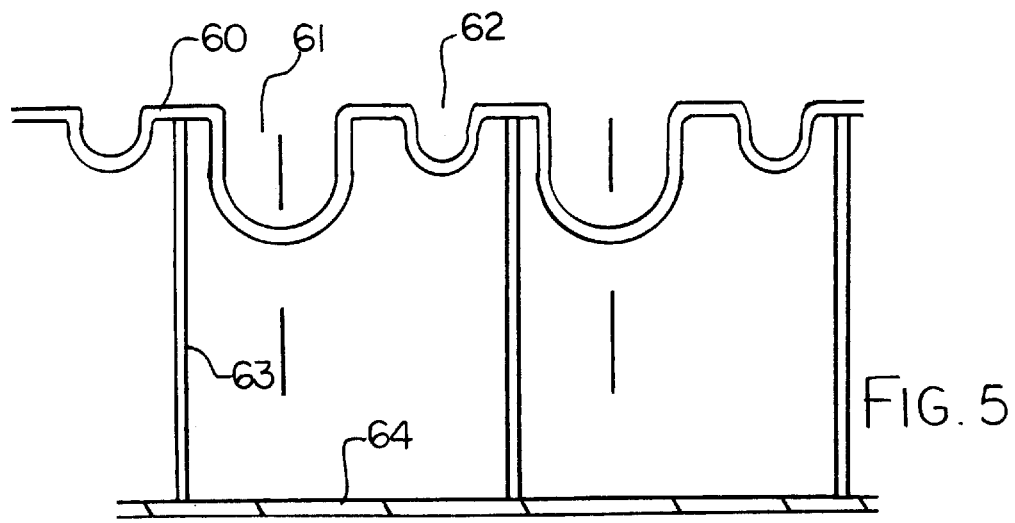
FIG. 5 is a front elevational view of a second modified arrangement.
Figure 4:
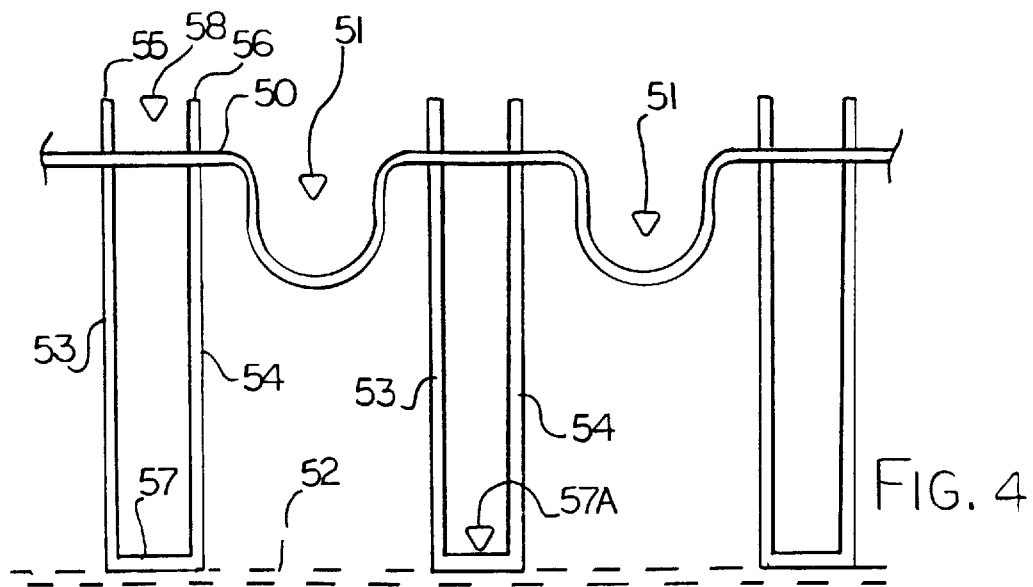
FIG. 4 is a front elevational view of a first modified arrangement.

Turning now to FIGS. 4, 5 and 6 further modifications are shown in which the apparatus is arranged for supporting only the pipes or for supporting only the pipes and an upper rebar section.

In FIG. 4 the apparatus comprises an upper wire support 50 which is generally horizontal and is bent to form a plurality of cradle sections 51 each for receiving a respective one of the pipe lengths. The wire 50 is supported above the base 52 by a plurality of vertical legs 53 and 54. The legs 53 and 54 are arranged in pairs. The legs 53 and 54 are manufactured by a loop of wire having ends 55 and 56 defining top ends of the legs which are positioned above the wire 50. The legs 53 and 54 thus extend downwardly from the top ends and at the base are bent to form a horizontal loop section 57. The loop section 57 of one pair of wires is bent forwardly out of the page as shown in FIG. 4 and the loop section 57A of the next adjacent pair of wires is bent rearwardly that is down into the paper as shown in FIG. 4. This provides a stable structure which may or may not require the presence of the base plate 52.

The apparatus shown in FIG. 4 allows the support of pipes in the cradle portions 51 and allows the support of rebar sections parallel to the pipes arranged in between the legs 53 and 54 and above the wire 50 so as to be supported within the rectangular U shaped portion 58 spaced to one side of the cradle 51.

In FIG. 5 is shown a somewhat similar arrangement for supporting pipe and rebar. In this arrangement the generally horizontal wire 60 is bent to form first cradle portions 61 and second cradle portions 62 for receiving the pipes and rebar respectively. The horizontal wire 60 is supported on a plurality of vertical legs 63 which are similarly bent to form horizontal portions again attached to a base plate 64.

In FIG. 6 is shown an arrangement similar to that of FIG. 5 except that the cradle portion 62 are omitted. Thus the horizontal wire 70 includes cradle portions 71 symmetrically between pairs of legs 72 and 73. Again the legs are bent at right angles to form horizontal portions 74. The upper ends of the legs is welded to the wire 70 as indicated at 75. The cradle is therefore designed solely for supporting the pipes. The arrangement shown in FIGS. 4, 5 and 6 can also use the snap fastening projections as shown in FIG. 3.

The arrangement of the present invention has the advantage that the pipes are properly cradled and supported and is not necessary to simply lie the pipes over the reinforcing bars so that the proper spacing between the pipes and the reinforcing bars can be properly controlled.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An ice rink comprising:

a horizontal ground surface;

a cast covering layer applied onto the ground surface;

a plurality of parallel cooling pipes embedded in the covering layer and lying in a first common horizontal plane;

a plurality of first reinforcing bars embedded in the covering layer, the reinforcing bars being mutually parallel and parallel to the pipes and lying in a second common horizontal plane at a height from the horizontal surface below that of the first plane and the first reinforcing bars being arranged at positions intermediate the pipes;

a plurality of second reinforcing bars embedded in the covering layer, the second reinforcing bars being mutually parallel and at right angles to the first reinforcing bars and to the pipes and lying in a third common horizontal plane at a height from the horizontal surface below that of the first plane and above the second plane, the second reinforcing bars extending across and resting upon the first reinforcing bars;

and a support apparatus for supporting the cooling pipes and the first and second reinforcing bars prior to installation of the cast covering layer the support apparatus comprising:

a base structure for resting on the ground surface;

a plurality of upstanding wire legs attached to the base structure so as to stand upwardly therefrom and arranged in a row of the legs across the base;

a set of first support wires connected to the legs, each first support wire being arranged to bridge a respective first area between a first leg of two of the legs and a second leg of the two of the legs and attached to the two of the legs so that the first support wires are held at a first height on the legs to support a respective one of the parallel pipes between the two of legs in said first horizontal plane;

a set of second support wires connected to the legs, each second support wire being arranged to bridge a second area between a second leg of the two of the legs and a first leg of a next adjacent two of the legs and attached to the legs so that the second support wires are held at a second height below the first height to support a respective one of the parallel reinforcing bars in said second lower horizontal plane;

both the first areas between the legs and the second areas between the legs being open to a top of the legs to allow the respective pipe and the respective reinforcing bar to be dropped downwardly from above the support apparatus onto the respective support wire, the first height of the first support wires being arranged relative to the second height of the second support wires such that, with the second reinforcing bars resting across the first reinforcing bars and the first reinforcing bars resting on the second support wires, the pipes are supported in the first plane above the second reinforcing bars and within the cast covering layer.

2. The ice rink according to claim 1 wherein each second support wire comprises a portion of a horizontal cross wire attached to the legs at a position thereon spaced upwardly from the base.

3. The ice rink according to claim 1 wherein the base comprises a plurality of horizontal wire portions each integrally formed with a respective one of the legs and bent relative thereto with alternate ones of the portions being directed in opposed directions relative to a common vertical plane of the legs.

4. The ice rink according to claim 3 including a horizontal base plate attached to the horizontal portions.

5. The ice rink according to claim 1 including means for supporting a top reinforcing bar at a height equal to or above the height of the pipe.

6. The ice rink according to claim 5 wherein the supporting means comprises a separate saddle portion engageable onto a top of a respective one of the legs.

7. The ice rink according to claim 6 wherein the saddle comprises a molded plastics member having a recess at a bottom portion for engaging over an inverted U-shaped bent portion at a top of a respective one of the legs and a receptacle at a top for receiving the reinforcing bar.

8. The ice rink according to claim 1 wherein the second support wires are arranged such that the legs are horizontally spaced by a distance sufficient just to receive the reinforcing bar therebetween.

9. An ice rink comprising:

a horizontal ground surface;

a cast covering layer applied onto the ground surface;

a plurality of parallel cooling pipes embedded in the covering layer and lying in a first common horizontal plane;

a plurality of first reinforcing bars embedded in the covering layer, the reinforcing bars being mutually parallel and parallel to the pipes and lying in a second common horizontal plane at a height from the horizontal surface below that of the first plane and the first reinforcing bars being arranged at positions intermediate the pipes;

a plurality of second reinforcing bars embedded in the covering layer, the second reinforcing bars being mutually parallel and at right angles to the first reinforcing bars and to the pipes and lying in a third common horizontal plane at a height from the horizontal surface below that of the first plane and above the second plane, the second reinforcing bars extending across and resting upon the first reinforcing bars;

and a support apparatus for supporting the cooling pipes and the first and second reinforcing bars prior to installation of the cast covering layer the support apparatus comprising:

a base structure for resting on the ground surface;

a plurality of upstanding wire legs attached to the base structure so as to stand upwardly therefrom and arranged in a row of the legs across the base;

a set of first support wires attached to the legs, each first support wire being arranged to bridge a respective first area between a first leg of two of the legs and a second leg of the two of the legs and attached to the two of the legs so that the first support wires are held at a first height on the legs to support a respective one of the parallel pipes between the two of legs in said first horizontal plane;

each first support wire comprising a U-shaped cradle integrally formed with the first leg and the second leg so as to be defined at a top of the respective leg by bending of the leg and being shaped to cup an outside surface of the respective pipe;

a set of second support wires attached to the legs, each second support wire being horizontal and arranged to bridge a second area between a second leg of the two of the legs and a first leg of a next adjacent two of the legs and attached to the legs so that the second support wires are held at a second height below the first height to support a respective one of the parallel reinforcing bars in said second lower horizontal plane;

both the first areas between the legs and the second areas between the legs being open to a top of the legs to allow the respective pipe and the respective reinforcing bar to be dropped downwardly from above the support apparatus onto the respective support wire, the first height of the first support wires being arranged relative to the second height of the second wires such that, with the second reinforcing bars resting across the first reinforcing bars and the first reinforcing bars resting on the second wires, the pipes are supported in the first plane above the second reinforcing bars and within the cast covering layer.

10. The ice rink according to claim 9 wherein the base comprises a plurality of horizontal wire portions each integrally formed with a respective one of the legs and bent relative thereto with alternate ones of the portions being directed in opposed directions relative to a common vertical plane of the legs.

11. The ice rink according to claim 10 including a horizontal base plate attached to the horizontal portions.

12. The ice rink according to claim 9 including means for supporting a top reinforcing bar at a height equal to or above the height of the pipe.

13. The ice rink according to claim 12 wherein the supporting means comprises a separate saddle portion engageable onto a top of a respective one of the legs.

14. The ice rink according to claim 13 wherein the saddle comprises a molded plastics member having a recess at a bottom portion for engaging over an inverted U-shaped bent portion at a top of a respective one of the legs and a receptacle at a top for receiving the reinforcing bar.

15. The ice rink according to claim 9 wherein the second support wires are arranged such that the legs are horizontally spaced by a distance sufficient just to receive the reinforcing bar therebetween.

* * * * *